United States Patent
Oelmann et al.

(10) Patent No.: US 12,316,097 B2
(45) Date of Patent: May 27, 2025

(54) POLARITY PROTECTION FOR A CONVERTER

(71) Applicant: Deere & Company, Moline, IL (US)

(72) Inventors: Dustin E. Oelmann, Fargo, ND (US); Richard E. Wainwright, Fargo, ND (US); Stephen P. Lind, Fargo, ND (US)

(73) Assignee: DEERE & COMPANY, Moline, IL (US)

( * ) Notice: Subject to any disclaimer, the term of this patent is extended or adjusted under 35 U.S.C. 154(b) by 303 days.

(21) Appl. No.: 18/173,663

(22) Filed: Feb. 23, 2023

(65) Prior Publication Data

US 2024/0030700 A1     Jan. 25, 2024

Related U.S. Application Data

(60) Provisional application No. 63/369,071, filed on Jul. 22, 2022.

(51) Int. Cl.
*H02H 7/12* (2006.01)
*H02H 11/00* (2006.01)
(Continued)

(52) U.S. Cl.
CPC ........ *H02H 7/1213* (2013.01); *H02H 11/003* (2013.01); *H02H 3/04* (2013.01); *H02H 9/005* (2013.01); *H02M 3/33584* (2013.01)

(58) Field of Classification Search
CPC .. H02H 3/04; H02H 3/18; H02H 7/10; H02H 7/12; H02H 7/1203; H02H 7/1213;
(Continued)

(56) References Cited

U.S. PATENT DOCUMENTS

| 8,537,517 B1 * | 9/2013 | Banak | H02H 9/025 361/93.1 |
| 11,277,014 B1 | 3/2022 | Lei et al. | |

(Continued)

FOREIGN PATENT DOCUMENTS

| CN | 212304820 U | 1/2021 |
| GB | 2588400 A | 4/2021 |
| WO | WO 2021253155 A1 | 12/2021 |

OTHER PUBLICATIONS

Texas Instruments, LM7481-Q1 datasheet, May 2020 [Revised Dec. 2020]. (Year: 2020).*

(Continued)

*Primary Examiner* — Fred E Finch, III

(57) ABSTRACT

A polarity detector is configured to detect whether a polarity of one of the secondary direct current terminals is reversed in polarity consistent with an improper connection of a removable load or the removable direct current energy source to the secondary direct current terminals. A protection module or transient clamp comprises a protection semiconductor switch with protection switched terminals and a protection control terminal. A controller is configured to control a plurality of switches of the circuit breaker and the protection module via a driver. Further, the controller is configured to open or activate the circuit breaker responsive to a signal or data message of the polarity detector detecting the improper connection.

12 Claims, 4 Drawing Sheets

(51) Int. Cl.
  *H02M 3/335* (2006.01)
  *H02H 3/04* (2006.01)
  *H02H 9/00* (2006.01)

(58) Field of Classification Search
  CPC .... H02H 9/005; H02H 11/002; H02H 11/003; H02M 1/32; H02M 3/33573; H02M 3/33584; H02J 7/0034
  See application file for complete search history.

(56) References Cited

U.S. PATENT DOCUMENTS

| | | | | |
|---|---|---|---|---|
| 2004/0150927 | A1* | 8/2004 | Strayer | H02H 9/04 361/82 |
| 2005/0007711 | A1* | 1/2005 | Liu | H02H 3/202 361/90 |
| 2014/0239713 | A1* | 8/2014 | Kanzaki | H02H 11/003 307/11 |
| 2018/0358798 | A1* | 12/2018 | Kadoya | H02J 1/14 |
| 2020/0076190 | A1* | 3/2020 | La Rosa | H02H 11/003 |
| 2021/0197781 | A1* | 7/2021 | Lucy | B60T 13/662 |
| 2022/0247189 | A1* | 8/2022 | Dunge | H02J 7/0034 |

OTHER PUBLICATIONS

Texas Instruments, "Six System Architectures With Robust Reverse Battery Protection Using an Ideal Diode Controller," Application Report SLVAES2, Apr. 2020. (Year: 2020).*
Jain, D. et al., "Automotive EMC-compliant reverse-battery protection with ideal-diode controllers," in Ana Des J, 4Q 2020, Texas Instruments publication SLYT802. (Year: 2020).*
Bidirectional Switch, [online]. Retrieved from the Internet: <URL: Bidirectional Switch | Homemade Circuit Projects (homemade-circuits.com)>.
EFuse With Fast Overvoltage Protection, Texas Instruments, Apr. 2018, pp. 1-49, [online]. Retrieved from the Internet: <URL: TPS2595xx 2.7 V to 18 V, 4-A, 34-mΩ eFuse With Fast Overvoltage Protection datasheet (Rev. C)>.
Extended European Search Report and Written Opinion issued in European Patent Application No. 23181172.0, dated Feb. 1, 2024, in 09 pages.

* cited by examiner

POLARITY PROTECTION FOR A CONVERTER

RELATED APPLICATION

This document (including the drawings) claims priority and the benefit of the filing date based on U.S. provisional application No. 63/369,071, filed Jul. 22, 2022, under 35 U.S.C. § 119 (e), where the provisional application is hereby incorporated by reference herein.

FIELD

This disclosure relates to polarity protection for a converter, such as a direct-current-to-direct-current converter, or other vehicular electronic device.

BACKGROUND

In certain background art, there is a risk that an energy source may be connected improperly with reverse polarity to a converter, such as direct-current-to-direct-current converter, which can damage the power semiconductor switches, the driver of the direct-current-to-direct current converter, or the energy source. Although connectors can be configured to only accept a corresponding polarity of the energy source, the connectors to the direct-current-to-direct current converter may be changed or replaced over time; using distinct connectors based on polarity can add to the manufacturing cost of the converter. Therefore, there is a need for a direct-current-to-direct-current converter with polarity protection.

SUMMARY

In accordance with one embodiment, polarity protection (e.g., reverse polarity protection) for a direct-current-to-direct-current converter, or other vehicle electronic device, comprises a primary direct current voltage bus, which can operate at a primary voltage level. For a configuration with a direct-current-to-direct-current converter as an electronic device, a secondary direct current voltage bus is configured to operate at a secondary voltage level different than the primary voltage level. A primary inverter bridge is configured to convert the primary direct current of the primary direct current bus to corresponding primary alternating current. The primary inverter bridge is coupled to the primary direct current voltage bus. A transformer is coupled between the primary alternating current at the primary voltage level and a secondary alternating current at the secondary voltage level. A secondary rectifier bridge is configured to rectify the secondary alternating current to secondary direct current of the secondary direct current bus, the secondary rectifier bridge coupled to the secondary direct current voltage bus.

A removable load or a removable direct current energy source is capable of being electrically connected the secondary direct current bus via a switchable electrical connection. A circuit breaker is capable of interrupting or disconnecting temporarily the switchable electrical connection to one terminal of the secondary direct current bus between the secondary direct current bus and the removable load or removable direct current source. A polarity detector is configured to detect whether a polarity of one of the secondary direct current terminals is reversed in polarity consistent with an improper connection of the removable load or the removable direct current energy source to the secondary direct current terminals. A protection module or transient clamp comprises a protection semiconductor switch with protection switched terminals and a protection control terminal. A controller is configured to control a plurality of switches of the circuit breaker and the protection module via a driver (e.g., gate driver). Further, the controller is configured to activate or open the circuit breaker responsive to a signal or data message of the polarity detector (e.g., reverse polarity detector) detecting the improper connection.

DETAILED DESCRIPTION

As used in this document, configured to, adapted to and arranged to may refer any of the following items: (1) software or program instructions that are stored in a data storage device 303 or other data storage and executable by any electronic data processor 301 to perform certain functions, software, (2) software or embedded firmware that are stored in the system 11 or its memory or data storage device 303 to perform certain functions, or (3) electronic, electrical circuits or modules that can perform substantially equivalent functions to the software, embedded firmware or program instructions.

A module refers to an electronic device (e.g., hardware), software, or a combination of the electronic device and hardware for performing a function. For example, the electronic device may comprise an electronic data processor 301 that is capable of executing software instructions stored in an electronic data storage device 303.

Figure 1:
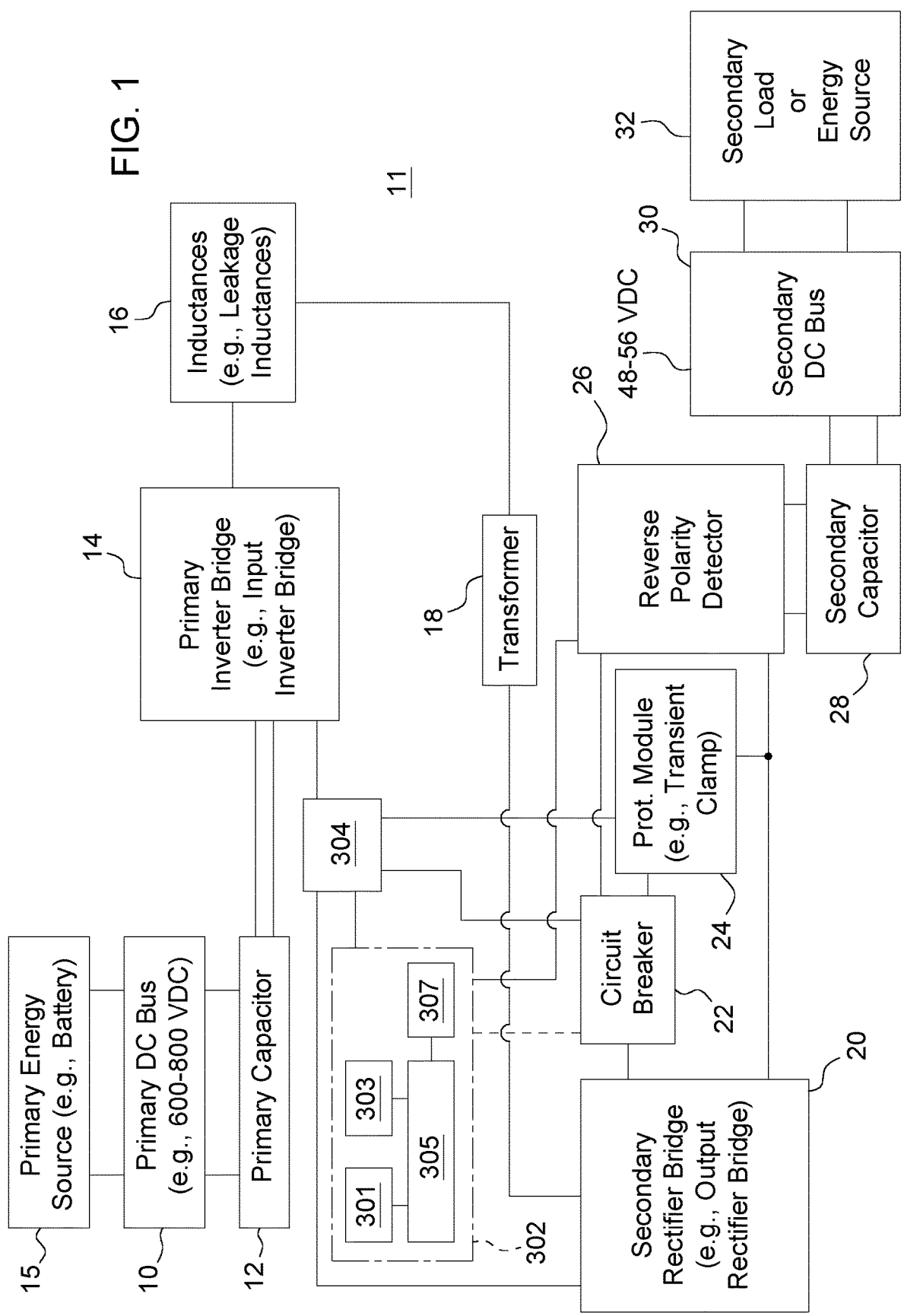
FIG. 1 is one embodiment of a block diagram of a reverse polarity protection for a direct-current-to-direct-current converter or other vehicular electronic device.

In accordance with one embodiment as illustrated in FIG. 1, a direct-current-to-direct-current (DC-to-DC) converter or other vehicular electronic device (e.g., an inverter or rectifier) with reverse polarity protection, transient protection, or both comprises the modules or blocks illustrated in FIG. 1 to define a system 11. The system 11, which can include a DC-to-DC converter or other vehicular electronic device (e.g., an inverter or rectifier), has a primary direct current voltage bus 10 at a primary voltage level. A secondary direct current voltage bus 30 is configured to operate at a secondary voltage level different than the primary voltage level.

A primary inverter bridge 14 (e.g., input inverter or input inverter bridge) is configured to convert the primary direct current of the primary direct current bus 10 to corresponding primary alternating current. The primary inverter bridge 14 is coupled to the primary direct current voltage bus 10. A transformer 18 is coupled between the primary alternating current (which is associated with primary AC terminals 251, 252, and 253) at the primary voltage level and a secondary alternating current (which is associated with AC terminals 254, 255, and 256) at the secondary voltage level.

A secondary rectifier bridge 20 (e.g., output rectifier or output rectifier bridge) is configured to rectify the secondary alternating current to secondary direct current of the secondary direct current bus 30. The secondary rectifier bridge 20 is coupled to the secondary direct current voltage bus 30, via a circuit breaker 22 and a polarity detector 26, among other modules. A secondary load or secondary energy source 32 may comprise a removable load or a removable direct current energy source, which is capable of being electrically connected the secondary direct current bus 30 via a switchable electrical connection (e.g., of the circuit breaker 22).

A circuit breaker 22 is capable of interrupting or disconnecting temporarily the switchable electrical connection to one terminal of the secondary direct current bus 30 between the secondary direct current bus 30 and the secondary load or secondary energy source 32 (e.g., removable load or removable direct current source).

A polarity detector 26 is configured to detect whether a relative polarity of the direct current terminals of the secondary load or secondary energy source 32 are reversed in polarity (e.g., or represent an improper polarity connection) with respect to one of the terminals of the secondary direct current bus 30. In one embodiment, a first circuit of the polarity detector 26 is connected across or in parallel to the DC terminals of the secondary DC bus 30.

The first circuit comprises a first diode, a second diode (e.g., of an optocoupler, photocoupler or opto-isolator) and one or more resistors in series with the first diode and the second diode. Here, in the first circuit, the first diode and the second diode are each reverse-biased between the negative and positive DC terminals of the secondary DC bus 30 to conduct current when the DC terminals of the secondary DC bus 30 are reverse biased or when a negative voltage is detected at the positive DC bus terminal of the secondary DC bus 30. Reverse biased means the cathode of a diode (e.g., first diode or second diode) is coupled to the positive DC terminal and the anode is coupled to the negative DC bus terminal. The second diode comprises a light-emitting diode that is integrated into an optocoupler, a photocoupler or opto-isolator, such that the first circuit is electrically isolated from a second circuit via optical communication between second diode (e.g., light emitting diode) and optical sensor (e.g., photo-transistor) or optical semiconductor switch.

The second circuit comprises the optical sensor or optical semiconductor switch: (a) that is integrated into the optocoupler, the photocoupler or the opto-isolator and (b) that is turned on, switched on or activated in response to the reception of light or electromagnetic radiation from the second diode of the first circuit. If the emitter or source of the optical semiconductor switch is coupled to ground or a negative DC bus of the secondary DC bus 30, the optical semiconductor switch (of the second circuit) produces a logic level (e.g., low logic level) representative of a reverse polarity signal, which can be provided as reverse polarity detection signal or reverse polarity data message to the controller 302.

A protection module 24 (e.g., transient clamp) comprises a protection semiconductor switch 308 (in FIG. 3) with protection switched terminals 327 and a protection control terminal 325. The protection module 24 may comprise a transient clamp, a diode clipping circuit, or limiter that operates on a DC voltage input/output to clamp, clip or limit transient voltages, such as negative voltage transients that exceed the DC bus voltage, such as the DC bus voltage of the secondary DC bus 30. For example, the negative voltage transient in the secondary DC bus 30 may arise because of an inductive kick when DC current is quickly removed upon opening or tripping of the circuit breaker 22, or its underlying semiconductor switches (122, 222), where the circuit breaker 22 may be tripped or opened in response to an overcurrent or detection of an observed current on the secondary DC bus 30 that exceeds a threshold current. In certain configurations, the protection module 24 may be used in conjunction with a bi-directional DC-to-DC converter at the secondary DC bus 30 that operates a secondary voltage level, such as a low voltage input/output, which is less than the primary voltage level of the primary DC bus 10. An illustrative example of one possible protection module 24 is described in greater detail in FIG. 3.

A controller 302 comprises an electronic data processor 301, a data storage device 303, and data port 307 that are coupled to a data bus 305 to support communications of data between the data processor 301, the data storage device 303 and the data port 307. The electronic data processor 301 may comprise a microcontroller, a microprocessor, a digital signal processor (DSP), an application specific integrated circuit (ASIC), a system on a chip (SOC), a programmable logic array (PLA), a field programmable gate array (FPGA), a Boolean logic device, a digital logic circuit, or the like. The data storage device 303 may comprise nonvolatile electronic memory, random access electronic memory, electronic memory, a magnetic storage device, an optical storage device, or another device for storing, accessing and retrieving digital and/or analog data. In certain configurations, the data storage device 303 may store software instructions or logic for execution by the electronic data processor 301. The data port 307 may comprise an input/output communications device, such as a data transceiver with buffer memory for storing data communications (e.g., status messages, control messages, or signals) from other modules of the system 11.

A controller 302 is configured to control a plurality of semiconductor switches (122, 222, 308) of the circuit breaker 22 and the protection module 24 via a driver 304 (e.g., gate driver). Further, the controller 302 is configured to activate or open the circuit breaker 22 responsive to a signal or data message: (a) of the polarity detector 26 detecting the improper connection and/or (b) the circuit breaker 22 detecting an overcurrent condition or current fault (e.g., short circuit). The circuit breaker 22 may comprise an integral current detector that detects when an observed current exceeds a threshold current (e.g., for one or more sampling intervals). Further, in one configuration, the observed current and threshold current are converted to corresponding voltage levels for a comparator input or operational amplifier to evaluate when or if the observed current exceeds the threshold current for a sampling interval.

The controller 302 or the data storage device 303 may store software instructions or control logic in accordance with the following: the protection semiconductor switch 308 of the protection module 24 and the semiconductor switches (122, 222) or the circuit breaker 22 are turned off (open circuit) until the polarity detector 26 (e.g., reverse polarity detector) reports no reverse polarity condition or state is present with respect to the second energy source 32 and the secondary DC bus 30. Once it is determined that there is not a reverse polarity on the DC input/output (e.g., between the second energy source 32 and the secondary DC bus 30), the protection semiconductor switch 308 turns on (to close) to create an electrically conductive path between the switched terminals 327 through the diode 310 (or one or more supplemental body diodes within semiconductor switches 222, such as field effect transistors)) to clamp, limit or clip negative transients. Once the protection semiconductor switch 308 of the protection module 24 (e.g., switched transient clamp, clipper or limiter) is turned on, the circuit breaker 22 can safely turn on (to close) and conduct current via the electrically conductive paths between or through the switched terminals 227.

A driver 304 is coupled to receive data message or control signals from the controller 302. A driver 304 comprises a circuit to provide logic level signals that are inputted to control terminals of any semiconductor switches to modulate, switch, or turn the semiconductor switches on or off for corresponding time intervals. In some configurations, the driver 304 may control the semiconductor switches of the primary inverter bridge 14 and the secondary rectifier bridge 20 consistent with pulse width modulation (PWM), which is based on control signals from the controller 302. The driver 304 is coupled to the control terminals of corresponding ones of the primary high-side semiconductor switches (117, 217, 317), primary low-side semiconductor switches (119, 219, 319), secondary high-side semiconductor switches (121, 221, 321) and secondary low-side semiconductor switches (123, 223, 323) to control, individually or collectively, the switching states of the primary high-side semiconductor switches (117, 217, 317), primary low-side semiconductor switches (119, 219, 319), secondary high-side semiconductor switches (121, 221, 321) and secondary low-side semiconductor switches (123, 223, 323), respectively, during a time interval.

In one embodiment, the circuit breaker 22 is configured to interrupt or disconnect temporarily the switchable electrical connection to one terminal of the secondary direct current bus 30 between the secondary direct current bus 30 and the secondary load or secondary energy source 32 to interrupt or disconnect temporarily another switchable electrical connection to the protection semiconductor switch (308 in FIG. 3) of the protection module 24 (e.g., transient clamp).

In some embodiments, the controller 302 is generally responsive to a control signal or data message of the polarity detector 26. For example, the controller 302, directly or indirectly via the driver 304, is configured to provide an enable signal to the protection semiconductor switch (308) responsive to the detection of normal or correct polarity, by the polarity detector 26 that generates a normal status indicator in control signal or the data message, of the removable direct current energy source connected to the secondary direct current terminals 30.

Figure 2:
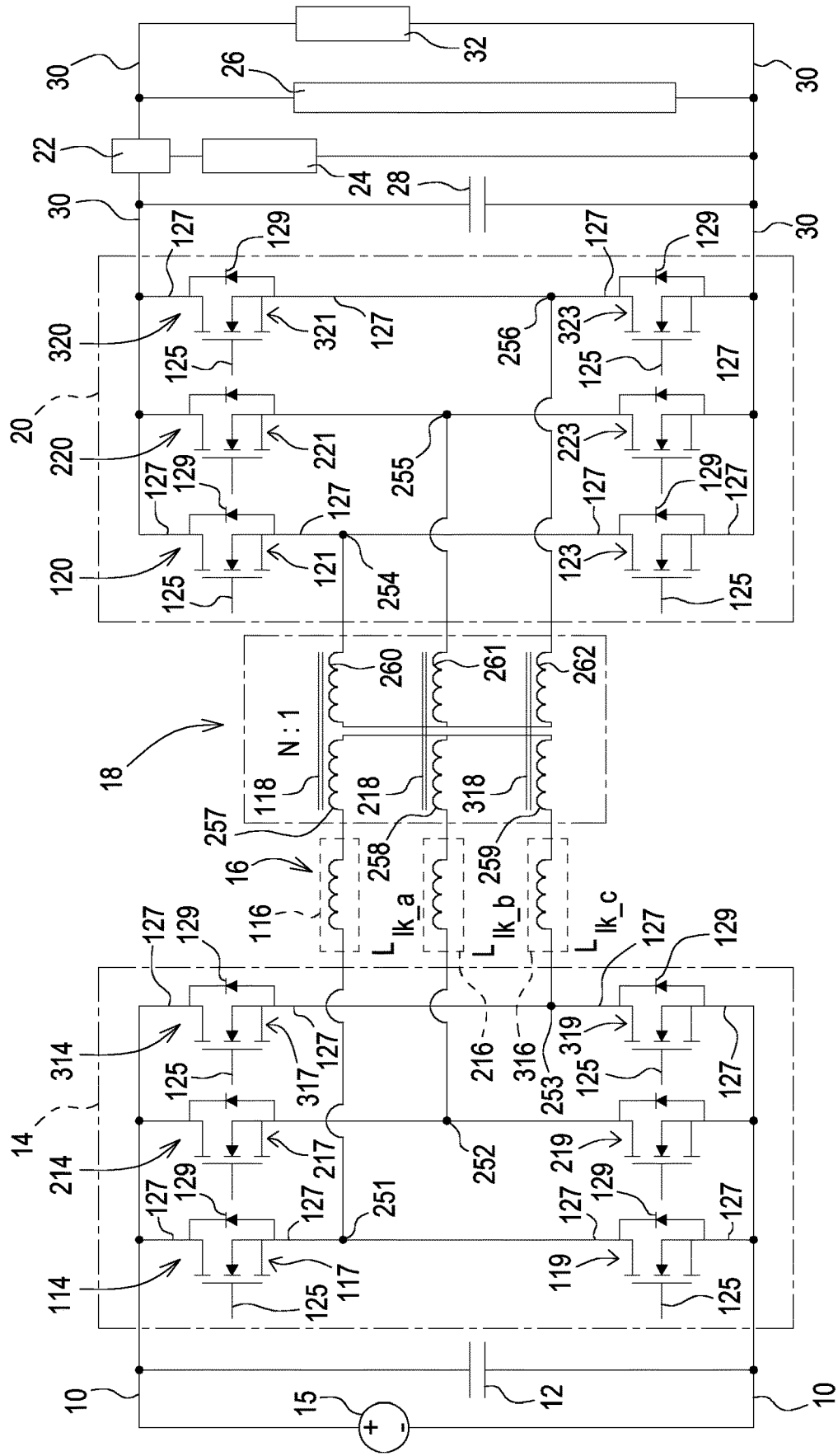
FIG. 2 is an illustrative schematic and block diagram of reverse polarity protection for a direct-current-to-direct-current converter, or other vehicular electronic device, consistent with FIG. 1.
Figure 3:
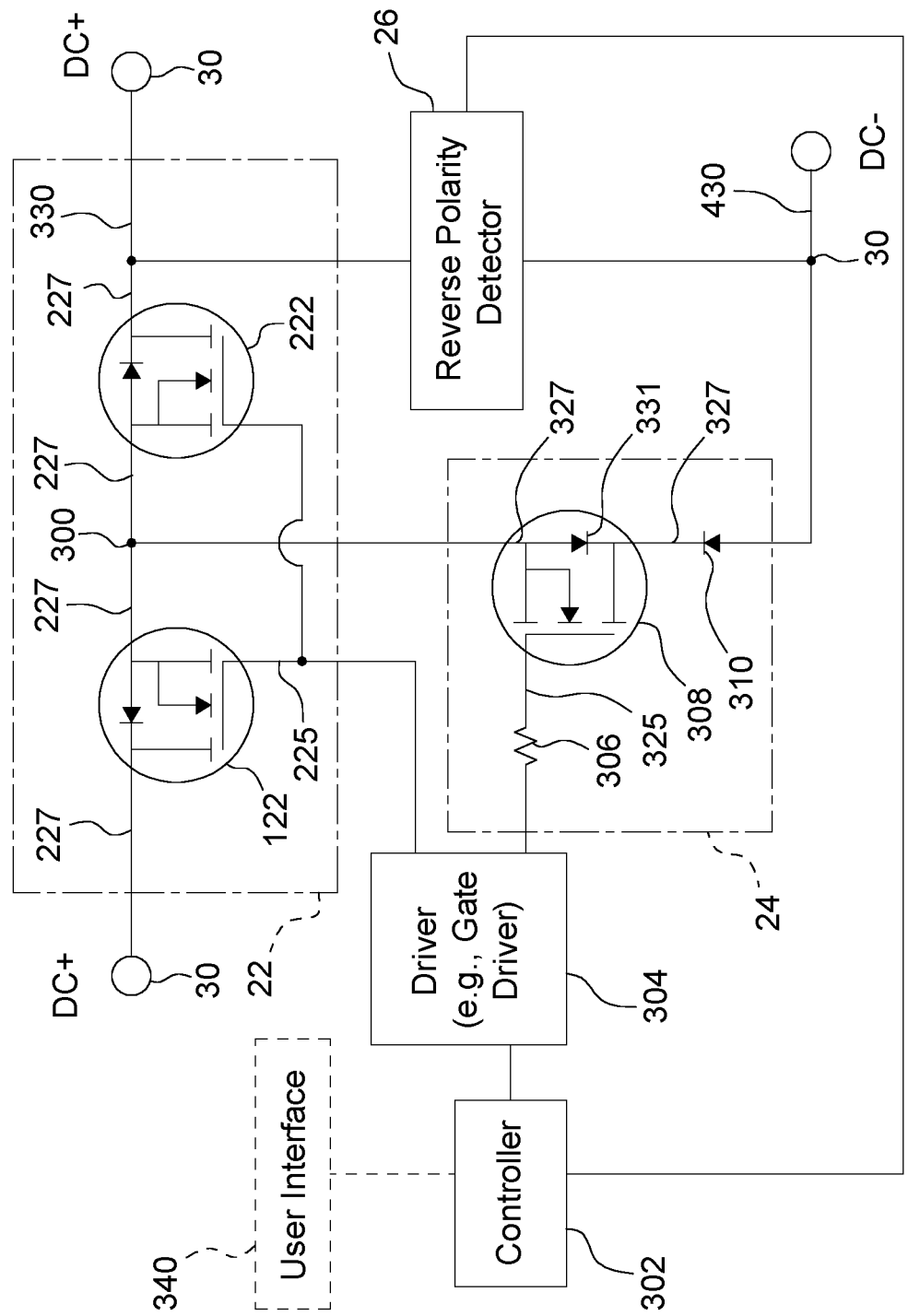
FIG. 3 is an example of possible schematic for the reverse polarity protection, which is illustrated in greater detail than FIG. 1 or FIG. 2.

As illustrated in FIG. 1 through FIG. 3, collectively, the protection module 24 may comprise a clamping diode 310 coupled in series to one of the protection switched terminals 327. Further, the enable signal (e.g., via the driver 304 as controlled by the controller 302), is configured to switch or place the protection semiconductor switch 308 in an on state such that the clamping diode 310 is capable of limiting voltage transient in or of a signal of the secondary direct current terminal 30. The clamping diode 310 may comprise a clipping circuit, a clamping circuit or a limiting circuit of one or more diodes, alone or together with a resistor to attenuate overvoltage over time arising from an inductive component associated with the secondary energy source 32 or secondary load. As best illustrated in FIG. 3, a clamping diode 310 is coupled in series to one of the protection switched terminals 327, where clamping diode 310 configured to clamp negative direct current transients in the secondary direct current bus 30 that exceeds a negative direct current bus terminal voltage. In general, to provide such protection against direct current transients, as illustrated in FIG. 3, the cathode of the clamping diode 310 is coupled to the protection switched terminals 327 and the anode of the clamping diode 310 is coupled to a negative secondary direct current terminal 30.

Further, in one illustrative embodiment, the clamping diode 310 is configured to protect the protection semiconductor switch 308 against an overvoltage state when the protection semiconductor switch 308 is disabled or turned off from an on state or an enabled state in which the secondary direct current terminal 30 is coupled to a circuit breaker 22 triggered to open upon detection of an overcurrent condition that exceeds a current threshold in conjunction with an inductive component of the secondary energy source 32 or removable load. For example, the secondary energy source 32 or removable load may have windings that can be modeled as an inductive component, or a battery pack may be modeled as an equivalent circuit with one or more inductive components.

Together with the clamping diode 310, or alone, a freewheeling or protection diode 331 is coupled in parallel with the protection semiconductor switch 308 to protect the protection semiconductor switch 308 against an overvoltage state from transient voltages associated with switching state transitions of the protection semiconductor switch 308, wherein upon switching the protection semiconductor switch 308 to an off state the protection diode conducts stored energy in the inductive component to a secondary energy source 32 or battery coupled to the secondary direct current terminals 30.

If the reverse polarity is detected by the polarity detector 26 (e.g., upon start-up or initialization of the controller 302 or the DC-to-DC converter, or system 11), the polarity detector 26 communicates a data message or status message to the controller 302; in response, the controller 302 is configured to control the protection module 24 to keep the protection semiconductor switch 308 in an off state to protect the clamping diode 310 in series with the protection switched terminals 327.

In some embodiments, where field-effect transistors are used, a circuit breaker 22 comprises at least one pair of semiconductor switches (122, 222) with their respective switched terminals 227 (e.g., gate terminals) coupled to the driver 304 (e.g., gate driver) and with their switched terminals 227 coupled in series with each other. In the context of a field-effect transistor, the switched terminals 227 may comprise a drain terminal and a source terminal.

In FIG. 1 and FIG. 2, the primary inverter bridge 14, the transformer 18 and the secondary rectifier bridge 20 collectively comprise a direct-current-to-direct current converter of the system 11. Further, in certain configurations or illustrative embodiments, the secondary voltage level comprises a lower voltage level (e.g., within a range of approximately 9 Volts DC to 60 Volts DC) than the higher voltage level of the primary voltage level (e.g., within a range of approximately 300 Volts DC to 750 Volts DC). However, other configurations may have a secondary voltage that is equal to greater than the primary voltage level and still fall within the scope of the appended claims. In certain examples, the direct-current-to-direct-current converter with reverse polarity protection comprises a bi-directional direct-current-to-direct-current converter, and wherein the primary direct current terminals of the primary DC bus 10 and the secondary direct current terminals of the secondary DC bus 30 each comprise an input/output terminal or direct terminal port.

An optional user interface 340 may be coupled to the controller 302. The optional user interface 340 may be indicated by dashed lines in the FIG. 1, for example. The user interface 340 may comprise one or more of the following items: electronic display (e.g., liquid crystal display or light emitting diode display), a keypad, a keyboard, a pointing device (e.g., electronic mouse), and a switch.

The controller 302 has software instructions and/or control logic for controlling the driver 304 (e.g., gate driver): (a) to place protection semiconductor switch 308 in an off state and (b) to send an alert signal, a fault alert message, or fault indicator to the user interface 340 if the polarity detector 26 provides the alert signal, the fault alert message, or the fault indicator to the controller 302 in response a detection of the reverse polarity fault by the polarity detector 26.

The diagram of FIG. 2 shows an illustrative example of a circuit for primary inverter bridge 14, a circuit for the secondary rectifier bridge 20, direct current filtering capacitors (12, 28), and transformer 18 configuration, among other things. Like elements and features in FIG. 1 and FIG. 2 are indicated by like reference numbers.

Although the DC-to-DC converter or system in FIG. 2 features a three-phase configuration, with three-phases for the primary inverter bridge 14, the secondary rectifier bridge 20 and the transformer 18 configuration, the DC-to-DC converter, rectifier, inverter or system 11 (e.g., with reverse polarity protection and negative transient overvoltage protection) may be configured as a single phase, dual phase, three-phase DC-to-DC converter; more generally, any N phase DC-to-DC converter where N is any positive integer greater than or equal to 1.

Each phase of the DC-to-DC converter or system 11 comprises a high-side semiconductor switch (117, 217, 317, 121, 221, 321) that is coupled to a low-side semiconductor switch (119, 219, 319, 123, 223, 323) at an alternating current terminal (251, 252, 253, 254, 255, 256). Each semiconductor switch (117, 217, 317, 121, 221, 321,119, 219, 319, 123, 223, 323) has a plurality of switched terminals 127 and a control terminal 125. For a field-effect transistor as the semiconductor switch, the switched terminals 127 comprise a source terminal and a drain terminal, whereas the control terminal 125 comprises a gate terminal. For a bipolar transistor as the semiconductor switch, the switched terminals 127 comprise an emitter and collector terminal, whereas the control terminal 125 comprises a gate terminal or a base terminal. A freewheeling diode 129 may be connected between the switched terminals 127 to protect a corresponding semiconductor switch from overvoltage associated with inductive components (e.g., of the transformer 18) during switching transitions (e.g., between on and off states) and/or to support continuous output current of the phase, for example.

In FIG. 2, each phase (114, 214, 314) of the primary inverter bridge 14 comprises a primary high-side semiconductor switch (117, 217, 317) and a primary low-side semiconductor switch (119, 219, 319), where each primary high-side semiconductor switch (117, 217, 317) and each primary low-side semiconductor switch (119, 219, 319) has switched terminals 127 and a control terminal 125. The driver 304 (e.g., driver or gate driver in FIG. 1 and FIG. 3) is coupled to one or more control terminals 125; in certain alternate configurations or alternate designs, the driver 304 is coupled to all of the control terminals 125 of the primary inverter bridge 14 and the secondary rectifier bridge 20. Further, the driver 304 may be connected to control terminals of semiconductor switches of the circuit breaker 22 and the protection module 24 (e.g., transient clamp, transient clipper or transient limiter).

In FIG. 2, if a DC input terminal or positive DC input terminal operates to transfer, unidirectionally, electrical energy from the primary to the secondary of the DC-to-DC converter, one switched terminal 127 of the primary high-side semiconductor switch (117, 217, 317) is coupled to the primary DC bus 10 and another switched terminal 127 of the primary high-side semiconductor switch (117, 217, 317) is connected to a corresponding switched terminal 127 of the primary low-side semiconductor switch (119, 219, 319) at a primary alternating current terminal (251, 252, 253) (e.g., AC output terminal, where operating to transfer, unidirectionally, electrical energy from the primary to the secondary of the DC-to-DC converter). Similarly, one switched terminal 127 (e.g., DC input terminal or negative DC input terminal) of the primary low-side semiconductor switch (119, 219, 319) is coupled to the primary DC bus 10 and another switched terminal 127 of the primary low-side semiconductor switch (119, 219, 319) is connected to a corresponding switched terminal 127 of the primary high-side semiconductor switch (117, 217, 317) at the primary alternating current terminal (251, 252, 253) (e.g., AC output terminal).

In FIG. 2, each phase (120, 220, 320) of the secondary rectifier bridge 20 comprises a secondary high-side semiconductor switch (121, 221, 321) and a secondary low-side semiconductor switch (123, 223, 323), where each secondary high-side semiconductor switch (121, 221, 321) and each secondary low-side semiconductor switch (123, 223, 323) has switched terminals 127 and a control terminal 125. The driver 304 (e.g., gate driver) is coupled to the control terminal 125 of each secondary semiconductor switch (121, 221, 321, 123, 223, 323). In FIG. 2, if the DC output terminal or positive DC output terminal operates to transfer, unidirectionally, electrical energy from the primary to the secondary of the DC-to-DC converter, one switched terminal 127 of the secondary high-side semiconductor switch (121, 221, 321) is coupled to the secondary DC bus 30 and another switched terminal of the secondary high-side semiconductor switch (121, 221, 321) is connected to a corresponding switched terminal 127 of the secondary low-side semiconductor switch (123, 223, 323) at a secondary alternating current terminal (254, 255, 256) (e.g., AC input terminal, where operating to transfer, unidirectionally, electrical energy from the primary to the secondary of the DC-to-DC converter). Similarly, one switched terminal 127 (e.g., DC input terminal) of the secondary low-side semiconductor switch (123, 223, 323) is coupled to the secondary DC bus 30 and another switched terminal 127 of the secondary low-side semiconductor switch (123, 223, 323) is connected to a corresponding switched terminal 127 of the secondary high-side semiconductor switch at the secondary alternating current terminal (254, 255, 256) (e.g., AC input terminal).

In one embodiment, one or more transformers 18 are configured to couple between the primary inverter bridge 14 and the secondary rectifier bridge 20. For example, a first transformer 118 may be used to couple a primary first phase 114 of the primary inverter bridge 14 to a secondary first phase 120 of the secondary rectifier bridge 20; a second transformer 218 may be used to couple a primary second phase 214 of the primary inverter bridge 14 to a secondary second phase 220 of the secondary rectifier bridge 20; a third transformer 318 may be used to couple a primary third phase 314 of the primary inverter bridge 14 to a secondary third phase 320 of the secondary rectifier bridge 20.

In an alternate embodiment, a single transformer 18 may couple alternating current signals between the primary inverter bridge 14 and the secondary rectifier bridge 20. Further, the single transformer 18 may have a common core (e.g., iron, ferrite or other) that has a first primary winding 257 in electromagnetic communication with a first secondary winding 260, a second primary winding 258 in electromagnetic communication with a second secondary winding 261, and a third primary winding 259 in communication with a third secondary winding 262.

A primary winding (257, 258, 259) of each transformer (18 or 118, 218, and 318) may be associated with a leakage inductance (16 or 116, 216, and 316) or a discrete inductor to support transfer of electrical energy from the primary winding (257, 258, 259) to the secondary winding (260, 261, 262); hence, from the primary DC bus 10 to the secondary DC bus 30. For example, the transformer 18 (in certain configurations, transformers 118, 218 and 318 for each corresponding phase) may facilitate the transfer of energy between a primary energy source 15 (e.g., primary DC energy source) coupled to the primary DC bus 10 and a secondary DC energy source 32 (or load) coupled to the secondary DC bus 30.

A primary energy source 15, such as battery or battery pack, is coupled to the primary DC bus 10. The primary energy source 15 refers to a primary energy storage source that is capable of storing electrical energy, such as any combination of a battery, battery pack, a network of capacitors, an ultracapacitor and supercapacitor. The primary DC bus 10 may have a filtering primary capacitor 12 to filter ripple current or alternating current from the primary DC bus 10.

In an alternate embodiment, the primary energy source 15 may comprise an electric machine, such as an electric motor, generator or alternator that is operated to generate electrical energy (e.g., by application of rotational energy from wind, water, fuel cell or internal combustion engine) where any alternator is associated with a rectifier to convert alternating current to direct current. Conversely, in another alternate embodiment, the primary energy source 15 may be replaced with a primary energy load, such as an electric machine that is operating in a motoring mode.

Analogously, a secondary energy source 32, such as battery or battery pack, is coupled to the secondary DC bus 30. The secondary energy source 32 refers to a primary energy storage source that is capable of storing electrical energy, such as any combination of a battery, battery pack, a network of capacitors, an ultracapacitor and supercapacitor. The secondary DC bus 30 may have a filtering secondary capacitor 28 to filter ripple current or alternating current from the secondary DC bus 30.

In an alternate embodiment, the secondary energy source 32 may comprise an electric machine, such as an electric motor, generator or alternator that is operated to generate electrical energy (e.g., by application of rotational energy from wind, water, fuel cell or internal combustion engine), where any alternator is associated with a rectifier to convert alternating current to direct current. Conversely, in another alternate embodiment, the secondary energy source 32 may be replaced with a secondary energy load, such as an electric machine that is operating in a motoring mode.

As illustrated in FIG. 1 and FIG., 3, the circuit breaker 22 is connected in series with one terminal of the secondary DC bus 30. For example, as illustrated, the circuit breaker 22 is connected in series with a positive terminal of the secondary DC bus 30 such that: (a) the controller 302 may control the circuit breaker 22 and/or (b) the circuit breaker 22 itself control the circuit breaker 22 to temporarily disconnect or interrupt the electrical connection between the DC-to-DC converter from the secondary energy source 32, such as a secondary energy source 32 that is connected with incorrect polarity to the secondary DC bus 30, as detected by the polarity detector 26, which communicates a reverse polarity detection signal, a reverse polarity detection data message, a normal polarity detection signal, or normal polarity detection data message to the controller 302, to the circuit breaker 22, or to both the controller 302 and the circuit breaker 22.

In an alternate embodiment, the circuit breaker 22 may be associated with an integral or separate current sensor that senses an observed current (e.g., total observed current) that is transmitted through the switched terminals 227 of the semiconductor switches (112, 222) or switching network to determine whether the observed current exceeds a threshold maximum current (e.g., based on the specifications of the secondary energy source 32 or secondary energy load) to trip or open the circuit breaker 22, which refers to having an open state or open circuit between the switched terminals 227 to protect the secondary energy source 32 or secondary energy load against overcurrent or excessive current that might otherwise cause thermal damage to (or reduced longevity of) the secondary energy source 32 or secondary energy load, among other things.

In one embodiment, the protection module 24 is coupled to the circuit breaker 22 and to the secondary DC bus 30. For example, the protection module 24 is connected between a positive DC bus terminal and a negative DC terminal of the secondary DC bus 30 when the circuit breaker 22 provides an electrical connection to the secondary load or secondary energy storage device (e.g., when the circuit breaker 22 switches are active or in an state). Conversely, the protection module 24 is not connected to the positive DC bus terminal when the circuit breaker 22 opens or switches off the electrical connection to the secondary load or secondary energy storage device 32. For example, "opens or switches off the electrical connection" can mean when one or more semiconductor switches of circuit breaker 22 switches are inactive, nonconductive, or in a suitable state (e.g., off state for normally open switch or an on state for normally closed switch) such that material or significant current is not passed between the switched terminals of the one or more semiconductor switches.

FIG. 3 illustrates a block diagram of one embodiment of a system for reverse polarity detection, transient protection, or both. The system comprises a secondary direct current bus 30 of a DC-DC converter or another electronic device. A secondary energy source 32, such as a removable direct current energy source, is capable of being electrically connected to the secondary direct current bus 30 via a switchable electrical connection. In an alternate embodiment, the secondary energy source 32 is replaced by a removable direct current load.

In one embodiment, a circuit breaker 22 is configured to interrupt or disconnect temporarily the switchable electrical connection to one terminal of the secondary direct current bus 30 between the secondary direct current bus 30 and the removable load or the secondary energy source 32 (e.g., removable direct current source). For example, the circuit breaker 22 may interrupt or disconnect temporarily the switchable electrical connection to one terminal of the secondary direct current bus 30 between the secondary direct current bus 30 and the removable load or the secondary energy source 32 based on any of the following: (a) the detection of reverse polarity connection between the direct current bus 30 and the secondary energy source 32, or (b) the detection of excessive observed current flowing through the circuit breaker 22 (e.g., one or more switched terminals 227 of semiconductor switches 122, 222) that exceeds a maximum current threshold, consistent with the secondary energy source 32 (e.g., or secondary energy load), or both detection of reverse polarity connection and excessive observed current.

A polarity detector 26 is configured to detect whether a polarity of direct current terminals of: the secondary energy source 32, such as the removable secondary direct current energy source, are incorrectly wired, improperly connected or reversed in polarity (which individually or collectively can be defined as an improper electrical connection) with respect to the corresponding secondary direct current terminals 30.

Similarly, an alternate embodiment, a polarity detector 26 is configured to detect whether a polarity of direct current terminals of: the secondary load (e.g., which replaces the secondary energy source 32) are incorrectly wired, improperly connected or reversed in polarity (which individually or collectively can be defined as an improper electrical connection) with respect to the corresponding secondary direct current terminals 30.

In FIG. 3, a protection module 24 may comprise a transient clamp, a transient clipper or a transient limiter that protects one or more components of the DC-to-DC converter, rectifier, inverter or system 11 against overvoltage. For example, the protection module 24 comprises a protection semiconductor switch 308 with protection switched terminals 327 and a protection control terminal 325, where one of the switched terminals 327 is coupled to a clamping diode 310 that represents a transient clamp, a transient clipper, or a transient limiter. A clamping diode 310 may refer to a diode (a diode or bridge of diodes) that is used to prevent a signal from exceeding a defined voltage limit, a preset voltage limit, or a maximum voltage threshold. The clamping diode 310 is typically connected between a targeted signal (e.g., at node 300 with a negative transient component) and a reference signal (e.g., negative DC terminal 430 at secondary DC bus 30) to clamp, limit or clip the targeted signal if it exceeds the reference signal (e.g., of voltage of the negative DC terminal).

A controller 302 is configured to control a plurality of switches (122, 222) of the circuit breaker 22 and protection module 24 via a driver 304 (e.g., gate driver), where the controller 302 activates (e.g., opens, trips, switches or controls), or is configured to activate (e.g., open, trip, switch, control), the circuit breaker 22 responsive to a polarity detection signal or polarity detection data message of the polarity detector 26 detecting an improper electrical connection between respective terminals of the (removable) secondary DC source 32 and the secondary DC bus 30, or another improper electrical connection between respective terminals of a (removable) secondary DC load and the secondary DC bus 30. The secondary DC source 32 may be removable (uninstalled and reinstalled, or disconnected and reconnected) from the DC-to-DC converter or other electronic device for replacement, repair, servicing, or the like.

In one embodiment, the circuit breaker 22 is configured to interrupt or disconnect temporarily a switchable electrical connection to one terminal of the secondary direct current bus 30 between the secondary direct current bus 30 and the removable load or removable direct current source (e.g., 32) and to interrupt or disconnect temporarily a switchable electrical connection of semiconductor switches (122, 222) or another switchable electrical connection to the protection semiconductor switch 308 of the transient clamp. For example, a circuit breaker 22 comprises at least one pair of semiconductor switches (122, 222) with their respective gate terminals 225 coupled to the driver 304 (e.g., gate driver) and with their switched terminals 227 coupled in series with each other (e.g., in line with the positive terminal of the secondary DC bus 30). As illustrated in FIG. 3, node 300 is defined where the pair of semiconductor switches (122, 222) are connected or coupled to each other at switched terminals 227; node 200 is connected or coupled to the protection module 24, or more particularly, to a switched terminal 327 of a protection semiconductor switch 308.

The controller 302 is capable of being responsive to a reverse polarity detection signal, a normal polarity detection signal, reverse polarity data detection message, a normal polarity data detection message, or detection of an improper electrical connection by the polarity detector 26 (e.g., reverse polarity detector). The protection module 24 may operate, or be controlled by the controller 302 directly or indirectly via the driver 304, in accordance with various examples, which may be applied separately or cumulatively.

In a first example of operating the protection module 24, the controller 302 is configured to provide an enable signal, directly or indirectly via the driver 304, to the protection semiconductor switch 308 to activate, to close, to turn on, or to place in an on state the protection semiconductor switch 308 responsive to the detection of normal or correct polarity (e.g., by the polarity detector 26 in a normal polarity detection data message or in a normal polarity detection signal) of the removable direct current energy source (e.g., 32) connected to the secondary direct current terminals 30.

In second example of operating the protection module 24, if the reverse polarity is detected (e.g., by the polarity detector 26 in a reverse polarity detection data message or in a reverse polarity detection signal), the polarity detector 26, the controller 302, and/or the driver 304 keep, maintain or transition the protection semiconductor switch 308 in or to an off state to protect the clamping diode 310 in series with the protection switched terminals 327.

In a third example of operating the protection module 24, if the reverse polarity is detected (e.g., by the polarity detector 26 in a reverse polarity detection data message or in a reverse polarity detection signal), the polarity detector 26 is configured to provide a disable signal, directly or indirectly via the driver 304, to the protection semiconductor switch 308 to deactivate, turn off, or place in an off state the protection semiconductor switch 308 to protect the clamping diode 310 in series with the protection switched terminals 327 to protect the clamping diode 310 in series with the protection switched terminals 327.

In a fourth example of operating the protection module 24, the protection module 24 comprises a clamping diode 310 coupled in series to one of the protection switched terminals 327; the enable signal is configured to switch or place the protection semiconductor switch 308 in an on state such that the clamping diode 310 is capable of limiting voltage transient at a signal of the secondary direct current terminal 30. For example, a clamping diode 310 is coupled in series to one of the protection switched terminals 327, where the clamping diode 310 configured to clamp negative direct current transients in the secondary direct current bus 30 that exceeds a negative direct current bus terminal voltage (or some greater maximum terminal voltage, such as a multiplicative factor or ratio multiplied by the direct current bus terminal voltage). As illustrated in the configuration of FIG. 3, a cathode of the clamping diode 310 is coupled to the protection switched terminals 327 and an anode of the clamping diode 310 is coupled to a negative secondary direct current terminal of the secondary DC bus 30.

In a fifth example of operating the protection module 24, the clamping diode 310, alone or together with a current-limiting resistor (not shown) in series with the clamping diode 310, is configured to protect the protection semiconductor switch 308 against an overvoltage state when the protection semiconductor switch 308 is disabled or turned off from an on state or enabled state in which the secondary direct current terminal of the secondary DC bus 30 is coupled to a circuit breaker 22 triggered to open upon detection of an overcurrent condition that exceeds a current threshold in conjunction with an inductive component of the secondary energy source 32 or inductive component or a removable load. For example, the inductive component is defined by an equivalent circuit model of the secondary energy source 32 or the inductive component, such as a winding of secondary energy source 32 that comprises an electric machine with the winding.

In one embodiment, a freewheeling or protection diode 331 is coupled in parallel with the protection semiconductor switch 308 to protect the protection semiconductor switch 308 against an overvoltage state from transient voltages associated with switching state transitions of the protection semiconductor switch 308, wherein upon switching the protection semiconductor switch 308 to an off state the protection diode conducts stored energy in the inductive component to an energy storage device (e.g., 32) or battery coupled to the secondary direct current terminals 30.

The controller 302, responsive to a control signal of the (reverse) polarity detector 26, is configured to provide an enable signal to the protection semiconductor switch 308 responsive to the detection of normal or correct polarity of the removable direct current energy source (e.g., 32) connected to the secondary direct current terminals 30.

In certain embodiments, the protection module 24 further comprises a clamping diode 310 coupled in series to one of the protection switched terminals 327 and wherein the enable signal is configured to switch or place the protection semiconductor switch 308 in an on state such that the clamping diode 310 is capable of limiting voltage transient at a signal of the secondary direct current terminal 30.

In one embodiment, a clamping diode 310 is coupled in series to one of the protection switched terminals 327, where the clamping diode 310 is configured to clamp negative direct current transients in the secondary direct current bus 30 that exceeds a negative direct current bus terminal voltage or that exceed another maximum DC voltage threshold. Further, a cathode of the clamping diode 310 is coupled to the protection switched terminals 327 and an anode of the clamping diode 310 is coupled to a negative secondary direct current terminal of the secondary DC bus 30.

In certain configurations, the clamping diode 310 is configured to protect the protection semiconductor switch 308 against an overvoltage state when the protection semiconductor switch 308 is disabled or turned off from an on state or enabled state in which the secondary direct current terminal is coupled to a circuit breaker 22 triggered to open upon detection of an overcurrent condition that exceeds a current threshold in conjunction with an inductive component of secondary energy source 32 or any removable load (e.g., that is used instead of or to replace the secondary energy source 32).

A freewheeling or protection diode 331 is coupled in parallel with the protection semiconductor switch 308 to protect the protection semiconductor 308 against an overvoltage state from transient voltages associated with switching state transitions (e.g., soft or hard switching transitions) of the protection semiconductor switch 308. Further, upon switching the protection semiconductor switch 308 to an off state the protection diode 310 conducts stored energy in the inductive component to an energy storage device (e.g., 32) or battery coupled to the secondary direct current terminals 30.

Figure 4:
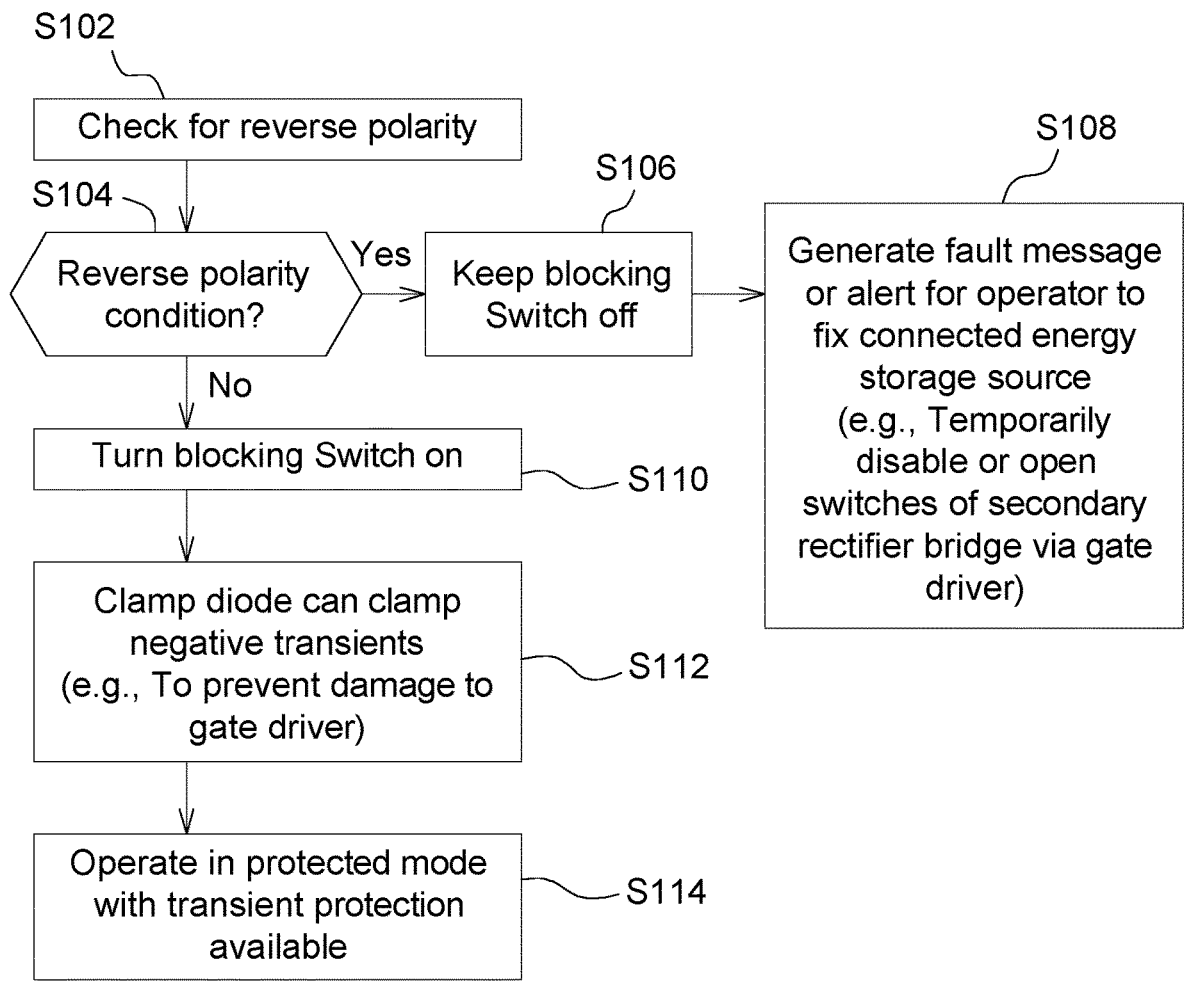
FIG. 4 is an embodiment of a flow chart of a method for operating reverse polarity protection for a direct-current to direct-current converter.

FIG. 4 is one embodiment of a flow chart of a method for operating or providing reverse polarity protection of system 11, such as a DC-to-DC converter, or another vehicular electronic device. The method of FIG. 4 begins in step S102.

In step S102, the polarity detector 26 checks or detects for reverse polarity connection, a normal polarity connection, or both. For example, the polarity detector 26 checks for or evaluates a reverse polarity coupling or improper electrical connection (e.g., of the respective DC terminals) between a secondary energy storage device 32 (e.g., a battery or battery pack) and the secondary direct current bus 30.

If the polarity detector 26 detects a reverse polarity condition associated with the connection of the energy storage device (e.g., secondary energy source 32) to a direct current bus, such as the secondary direct current bus 30, the polarity detector 26 or the controller 302 continues to step S106. However, if the polarity detector 26 does not detect a reverse polarity condition (e.g., negative reverse polarity detection state or status) or if the polarity detector 26 detects a normal polarity condition (e.g., normal polarity state or status), the polarity detector 26 or the controller 302 continues to step S110.

In step S106, responsive to the detection of the reverse polarity condition, the controller 302 receives a reverse polarity status signal or a reverse polarity data message and the controller 302 keeps the protection module 24, or its protection switch 308 or its blocking switch, in an off state or a state that does not conduct material or significant current between the switched terminals 327.

In step S108, the controller 302 generates a fault message or alert for the operator, which is displayed, indicated or outputted, visually, aurally, or both, from the user interface 340. For example, the fault message or alert indicates for the operator to fix or inspect an electrical connection (e.g., improper electrical connection) between the DC terminals of the secondary energy source 32 and the corresponding DC terminals of the secondary DC bus 30. Further, the controller 302 may send a control signal, a control data message or a status data message to any of the following: the user interface 340, the driver 304, the circuit breaker 24, and/or the production module 24; the control signal or control data message may be based on, or derived from, the fault message or alert. For example, the controller 302 may send a control signal, a control data message or a status data message to driver 304 such that the driver 304 may temporarily disable or open one or more semiconductor switches (121, 221, 321, 123, 223, 323) of the secondary rectifier bridge 20 to prevent damage to the secondary bridge or DC-to-DC converter or another vehicular electronic device.

In step S110, the controller 302 or driver 304 (e.g., as directed by the controller 302) switches on or turns on the protection switch 308 or blocking switch. For example, the controller 302 provides a control signal to the driver 304, which in turn, activates the protection semiconductor switch 308 via its control terminal 325 (and series resistor 306) to allow direct current to flow through and/or be clamped by the clamping diode 310.

In step S112, the clamping diode 310 is configured to clamp negative transients in the direct current. For example, the clamping diode 310 may clamp negative transients in the direct current to prevent damage to the driver 304 (e.g., gate driver) or one or more semiconductor switches within the driver 304.

In step S114, a controller 302, protection module 24, or converter operates in a protected mode with transient protection available, such as protection that is responsive to transients in the direct current path (e.g., between a DC positive terminal and a DC negative terminal (430) of the secondary DC bus 30) that are capable of being clamped or clipped at a particular maximum voltage level by the clamping diode 310. Further, in an alternate embodiment, supplemental arrangements of Zener diodes are connected back-to-back (e.g., cathode to anode to operate with reverse bias voltage regulation) across the terminals of the DC bus 30.

While the disclosure has been illustrated and described in detail in the drawings and foregoing description, such illustration and description is to be considered as exemplary and not restrictive in character, it being understood that illustrative embodiments have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

The following is claimed:

1. A direct-current-to-direct-current converter with reverse polarity protection, the converter comprising:
   a primary direct current voltage bus at a primary voltage level;
   a secondary direct current voltage bus at a secondary voltage level different than the primary voltage level;
   a primary inverter bridge configured to convert the primary direct current of the primary direct current bus to corresponding primary alternating current, the primary inverter bridge coupled to the primary direct current voltage bus;
   a transformer coupled between the primary alternating current at the primary voltage level and a secondary alternating current at the secondary voltage level;
   a secondary rectifier bridge configured to rectify the secondary alternating current to secondary direct current of the secondary direct current bus, the secondary rectifier bridge coupled to the secondary direct current voltage bus;
   a removable load or a removable direct current energy source capable of being electrically connected the secondary direct current bus via a switchable electrical connection;
   a circuit breaker for interrupting or disconnecting temporarily the switchable electrical connection to one terminal of the secondary direct current bus between the secondary direct current bus and the removable load or removable direct current source;
   a reverse polarity detector configured to detect whether a polarity of one of the secondary direct current terminals is reversed in polarity consistent with an improper connection of the removable load or the removable direct current energy source to the secondary direct current terminals;
   a protection module or transient clamp comprising a protection semiconductor switch with protection switched terminals and a protection control terminal; and
   a controller configured to control a plurality of switches of the circuit breaker and the protection module via a gate driver, the controller activating the circuit breaker responsive to a signal or data message of the reverse polarity detector detecting the improper connection.

2. The converter according to claim 1 wherein the circuit breaker is configured to interrupt or disconnect temporarily the switchable electrical connection to one terminal of the secondary direct current bus between the secondary direct current bus and the removable load or removable direct current source and to interrupt or disconnect temporarily another switchable electrical connection to the protection semiconductor switch of the transient clamp.

3. The converter according to claim 1 wherein the controller, responsive to a control signal of the reverse polarity detector, is configured to provide an enable signal to the protection semiconductor switch responsive to the detection of normal or correct polarity of the removable direct current energy source connected to the primary direct current terminals.

4. The converter according to claim 3 wherein the protection module further comprises a clamping diode coupled in series to one of the protection switched terminals and wherein the enable signal is configured to switch or place the protection semiconductor switch in an on state such that the clamping diode is capable of limiting voltage transient in or of a signal of the secondary direct current terminal.

5. The converter according to claim 3 further comprising:
   a clamping diode coupled in series to one of the protection switched terminals, the clamping diode configured to clamp negative direct current transients in the secondary direct current bus that exceeds a negative direct current bus terminal voltage, a cathode of the clamping diode being coupled to the protection switched terminals and an anode of the clamping diode being coupled to a negative secondary direct current terminal.

6. The converter according to claim 4 wherein the clamping diode is configured to protect the protection semiconductor switch against an overvoltage state when the protection semiconductor switch is disabled or turned off from an on state or an enabled state in which the secondary direct current terminal is coupled to the circuit breaker triggered to open upon detection of an overcurrent condition that exceeds a current threshold in conjunction with an inductive component of the removable load.

7. The converter according to claim 6 wherein a freewheeling or protection diode is coupled in parallel with the protection semiconductor switch to protect the protection semiconductor switch against an overvoltage state from transient voltages associated with switching state transitions of the protection semiconductor switch, wherein upon switching the protection semiconductor switch to an off state the protection diode conducts stored energy in the inductive component to an energy storage device or battery coupled to the secondary direct current terminals.

8. The converter according to claim 6 wherein the circuit breaker comprises at least one pair of semiconductor switches with their respective gate terminals coupled to the gate driver and with their switched terminals coupled in series with each other.

9. The converter according to claim 1 wherein if the reverse polarity is detected, the reverse polarity detector and the protection module keep the protection semiconductor switch in an off state to protect a clamping diode in series with the protection switched terminals.

10. The converter according to claim 1 wherein the primary inverter bridge, the transformer and the secondary rectifier bridge collectively comprise a direct-current-todirect current converter; wherein the secondary voltage level comprises a lower voltage level than the higher voltage level of the primary voltage level.

11. The converter according to claim 10 wherein the direct-current-to-direct current converter comprises a bi-directional direct-current-to-direct-current converter, and wherein the primary direct current terminals and the secondary direct current terminals each comprise an input/output terminal or direct terminal port.

12. The converter according to claim 1 further comprising:
- a user interface coupled to the controller;
- the controller having control logic for controlling the gate driver to place protection semiconductor switch in an off state and to send an alert signal, a fault alert message, or fault indicator to the user interface if the reverse polarity detector provides the alert signal, the fault alert message, or the fault indicator to the controller in response a detection of the reverse polarity fault by the reverse polarity detector.

\* \* \* \* \*